(No Model.)

P. McGREGOR.
Nut Lock.

No. 243,146.  Patented June 21, 1881.

Witnesses:
John Grist
Fred. J. Rofa

Inventor:
P. MacGregor
By Henry Grist
Attorney.

United States Patent Office.

PETER McGREGOR, OF OTTAWA, ONTARIO, CANADA, ASSIGNOR OF ONE-THIRD TO ALEXANDER McLEAN, OF SAME PLACE.

NUT-LOCK.

SPECIFICATION forming part of Letters Patent No. 243,146, dated June 21, 1881.

Application filed April 16, 1881. (No model.)

*To all whom it may concern:*

Be it known that I, PETER MCGREGOR, of the city of Ottawa, in the county of Carleton, in the Province of Ontario, Canada, have invented certain new and useful Improvements in Nut-Locks; and I do hereby declare that the following is a full, clear, and exact description of the same.

This invention relates to that class of nut-locking devices for rail-joints in which the fish-plate is driven endwise to lock the nuts simultaneously within cavities in or against projections on the fish-plate; and the object of my invention is to lock the fish-plate so that after being driven endwise to lock the nuts it will not move by the jar of passing trains.

My invention consists of a spring-washer interposed between the fish-plate and the nut of a bolt, said washer having an end free beyond the nut, so that when the plate is driven endwise a sufficient distance to lock the nuts the free end of the washer will spring into the cavity and prevent the backward movement of the fish-plate until again lifted above the cavity, when the plate may be driven endwise to unlock the nuts.

Figure 1:
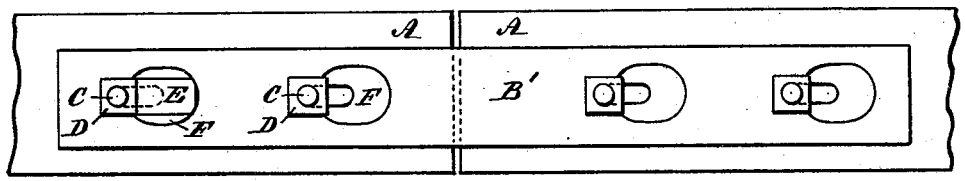
Figure 2:
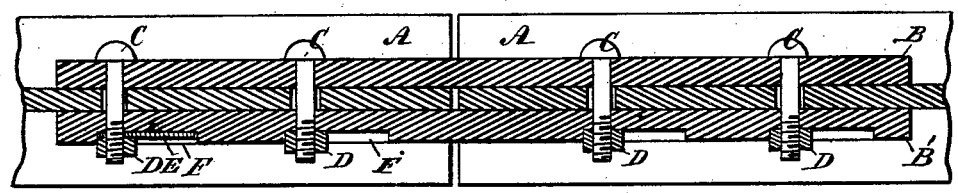
Figure 3:
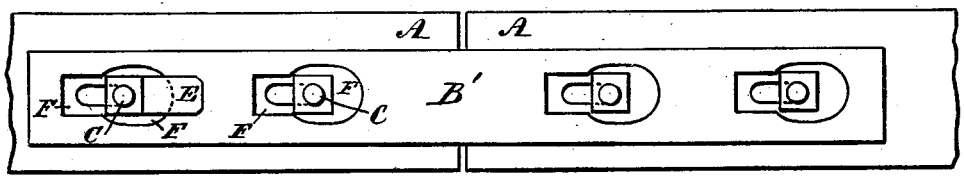
Figure 3:
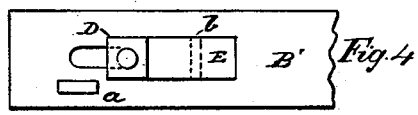
Figure 3:
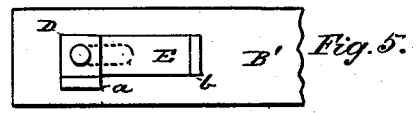

Fig. 1 is a side elevation of a rail-joint embodying my invention, the nuts and washer locked. Fig. 2 is a longitudinal section of the same. Fig. 3 is an elevation showing the position of the washer previous to locking the nuts. Figs. 4 and 5 are modifications of fish-plate.

A A are the adjacent ends of the rail-joint, B B' the fish-plates, C the bolts, and D the nuts, constituting the ordinary fastening.

The fish-plate B' is provided with bolt-holes elongated longitudinally within elongated cavities F, having a contraction at one end corresponding in width to that of the nuts, so that when the fish-plate is driven endwise after screwing on the nuts at the enlargement of the cavity the nuts will be locked in the contracted portion of the cavity. In such position the fish-plate is liable to work backward by the jarring of the rails. To prevent such motion is the object of my invention, and I accomplish it by the following means:

E is a washer of thin plate-steel, having a bolt-hole near one end, the other end possessing freedom and elasticity. The washer is placed between the plate and the nut on the bolt, the free end of the washer protruding over the enlarged wall at the end of the cavity in the fish-plate. In this position all the nuts are screwed home, and when the fish-plate is driven forward, in the usual manner, to lock the nuts, the free end of the washer will slide over the wall and fall into the cavity, and by the compression of the nut and elasticity of the washer be held to abut against the end of the cavity, thereby preventing a backward movement of the plate until the free end of the washer is again lifted above the cavity, when the fish-plate may be driven backward to unlock the nuts.

My invention is also applicable to fish-plates which have raised ribs $a$, instead of cavities, to engage with the nuts by providing the fish-plate with a transverse projection, $b$, for the end of the washer to stop against when the plate is driven forward to lock the nuts, as shown in Figs. 4 and 5.

I claim as my invention—

In combination with the rails, bolts, nuts, and fish-plates, one plate having cavities F, locking the nuts by its endwise movement, the washer E, having a free end to spring into abutting engagement with the end of cavity F when the plate is driven forward, as set forth, to prevent a backward movement of the plate, as described.

PETER McGREGOR.

Witnesses:
 FRED. J. ROSS,
 JOHN GRIST.